Feb. 21, 1956 F. G. SLONEK 2,735,415
COOLING SYSTEM FOR DIESEL ENGINE
Filed Sept. 20, 1954 2 Sheets-Sheet 1
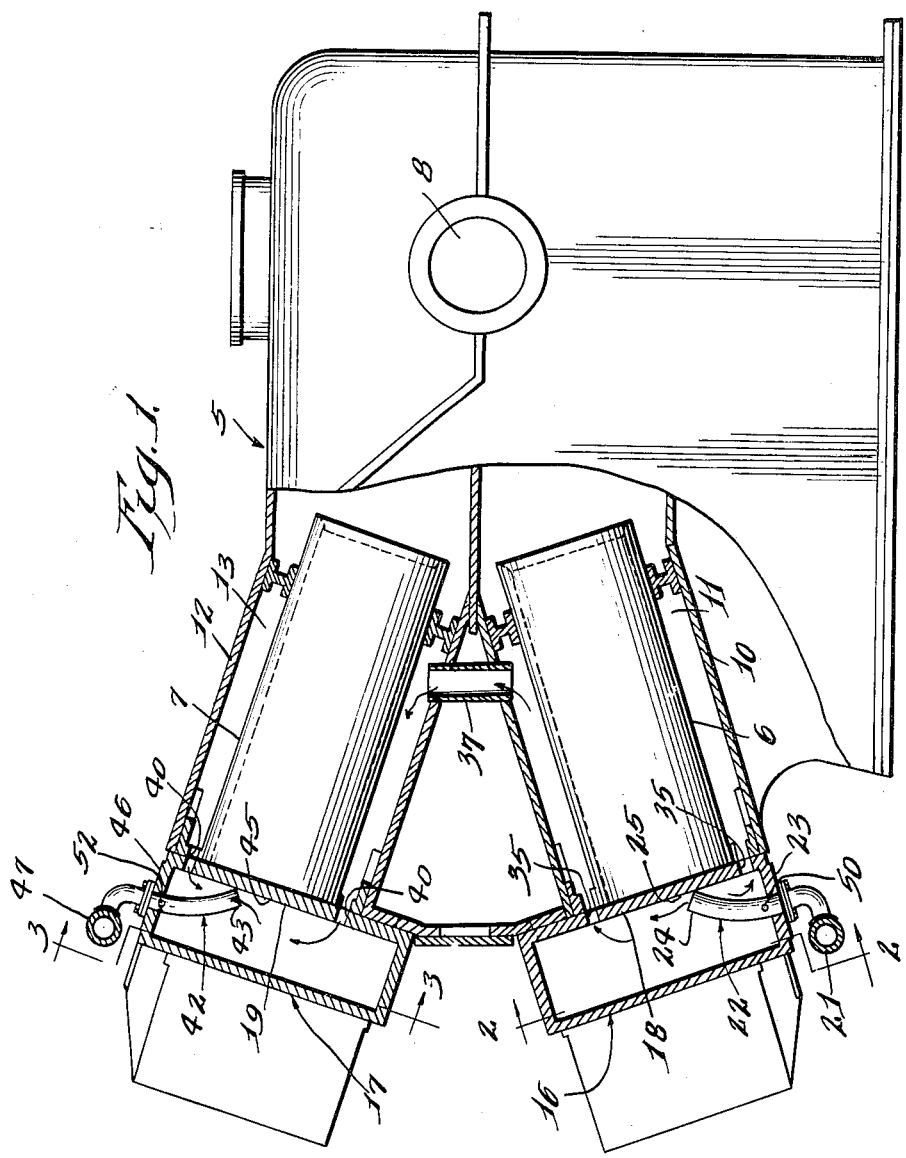
Inventor.
Frank G. Slonek.
By Zabel, Baker, York, Jones & Dithmar
Attorneys

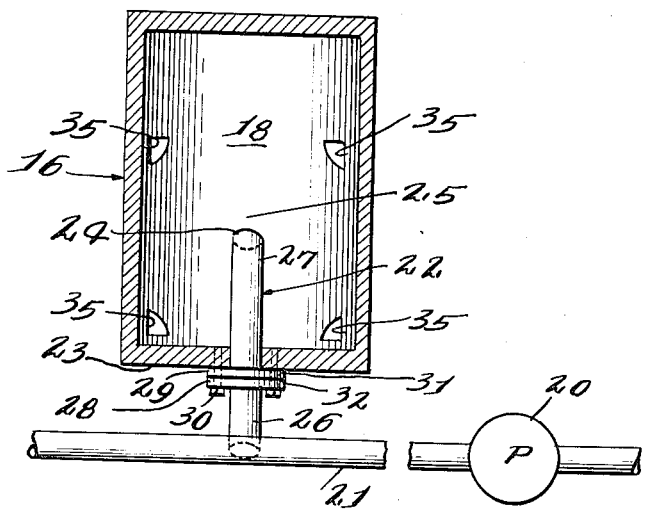
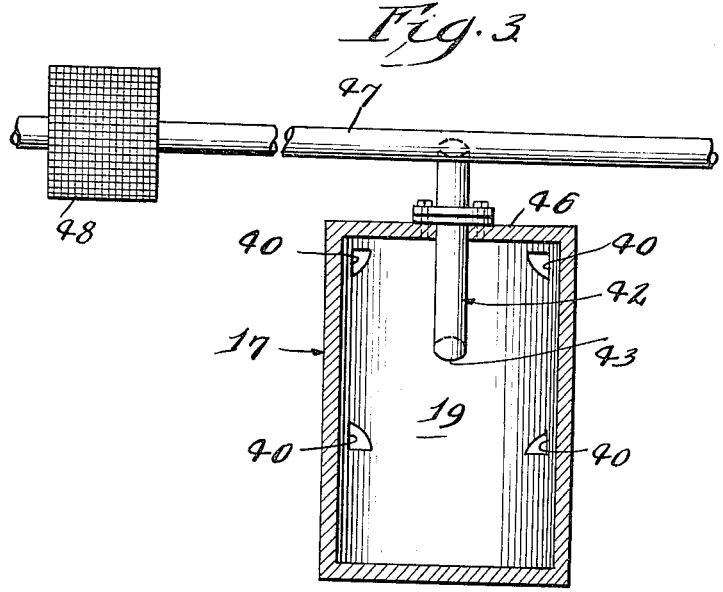

United States Patent Office 2,735,415
Patented Feb. 21, 1956

2,735,415

COOLING SYSTEM FOR DIESEL ENGINE

Frank G. Slonek, Chicago, Ill., assignor to Page Engineering Company, Chicago, Ill., a corporation of Illinois Application September 20, 1954, Serial No. 457,261

5 Claims. (Cl. 123—41.44)

This invention relates to a cooling system for a diesel engine.

Considerable difficulty has been experienced in providing proper cooling for high temperature parts of a diesel engine, particularly the cylinder heads. A diesel engine cylinder head comprises a hollow body wherein one wall thereof closes the otherwise open end of a cylinder. Cooling liquid circulates under pressure in the hollow interior of the cylinder head and dissipates the excessive heats developed in the cylinder-closing wall.

The zone of highest temperature in the cylinder-closing wall of a cylinder head is the region of the wall through which the fuel injection nozzle extends. This zone usually is the central portion of the wall. The nozzle-receiving opening in the wall, the nozzle therethrough and the comparatively high temperatures and pressures developed in the vicinity of the injection nozzle combine to provide a weakness situation. It has been found that most cylinder head failures involve cracks in the central region of the cylinder-closing wall, and in case of such failure, the cylinder head must be discarded and replaced with a new one at substantial expense.

One object of the invention, therefore, is to provide a cooling system wherein maximum cooling or heat exchange occurs at the central or hottest region of the cylinder-closing wall of the cylinder head. The present system has been found effective to substantially eliminate cylinder head failures in the central or hottest region of the cylinder-closing wall.

Another object of the invention is to provide a cooling system which affords extraordinary cooling at the central or hottest region of the cylinder-closing wall and which is so constructed that vapor pockets will not develop in the system. Also, substantially all the fluid may be drained from the system when desired.

Still another object is to provide such a cooling system wherein the portions thereof connected to a cylinder head may be detached readily when it is desired to remove the head from its associated cylinder. Remaining parts of the cooling system do not need to be disturbed when a cylinder head is removed.

Other objects, advantages and details of the invention will be apparent as the description proceeds, reference being had to the accompanying drawings wherein one form of the invention is shown. It is to be understood that the description and drawing are illustrative only, and that the scope of the invention is to be measured by the appended claims.

In the drawings:

Fig. 1 is a view, partly in section and partly in elevation, of a horizontal V-type diesel engine embodying the cooling system of the invention;

Fig. 2 is a sectional view on line 2—2 of Fig. 1, and

Fig. 3 is a sectional view on line 3—3 of Fig. 1.

Referring to the drawings, my improved cooling system is shown embodied in a horizontal V-type diesel engine generally designated 5 in Fig. 1. Certain other features of engine 5 form the subject matter of my co-pending applications entitled "Diesel Engine and Excavating Machine Embodying Same," Serial No. 457,257, filed September 20, 1954; "Timing System for Diesel Engine," Serial No. 457,259, filed September 20, 1954; and "Camshaft Drive System," Serial No. 457,258, filed September 20, 1954. The invention, however, is applicable to other types of diesel engines.

Engine 5, being of the horizontal V-type, has a plurality of lower cylinders 6 aligned in a lower tier and a plurality of upper cylinders 7 aligned in an upper tier, the cylinder axes lying in converging planes which intersect at the axis of a crankshaft 8.

A cylinder 6 has a spaced jacket 10 which defines an annular space 11 between the jacket and cylinder. Similarly, a cylinder 7 has a spaced jacket 12 which defines an annular space 13 between the jacket and cylinder.

A lower cylinder 6 has its outer, open end closed by a cylinder head generally designated 16. Similarly, an upper cylinder 7 has its open end closed by a cylinder head 17.

Cylinder heads 16 and 17 are hollow bodies having a plurality of exterior walls including cylinder-closing walls 18 and 19 respectively. In the case of each cylinder head a fuel injection nozzle extends more or less centrally through the head to a discharge point in the compression zone of the cylinder. Such nozzles are here omitted for clarity.

The improved cooling system of the invention includes a pump 20 (Fig. 2) located at some convenient point on the exterior of the engine. The usual cooling medium handled by pump 20 is water although other media such as anti-freeze liquids will sometimes be used.

A first pipe 21 leads from pump 20 to a point adjacent a lower cylinder head 16. First pipe 21, sometimes termed a "header," is part of a manifold system which serves all the cylinder heads in the lower tier of cylinders in the form of the invention here illustrated.

In the case of each lower cylinder 6, a second pipe 22 extends from first pipe 21 through lateral wall 23 of cylinder head 16 to a discharge or terminal end 24 adjacent cylinder-closing wall 18 of the head. The liquid discharge from second pipe 22 is directed at the central or hottest region 25 of wall 18.

As here shown, second pipe 22 is divided into two sections, an elbow section 26 extending from first pipe 21 and a gently curved section 27 extending from elbow section 26 through wall 23 to the aforesaid discharge or terminal end 24. The joined ends of sections 26 and 27 have flanges 28 and 29 which are secured together and to wall 23 by studs 30. A gasket 31 is positioned between flange 29 and wall 23 and a gasket 32 is positioned between the two flanges 28 and 29.

With this arrangement the external parts of the cooling system readily may be disassociated from cylinder head 16 simply by removing studs 30. Thus cylinder head 16 may be removed when necessary with minimum difficulty as far as the cooling system is concerned.

Cylinder-closing wall 18 of head 16 is provided with a plurality of ports 35 which lead from the hollow interior of head 16 to space 11 (Fig. 1) between cylinder 6 and jacket 10.

Cooling liquid such as water is pumped into cylinder head 16 through second pipe 22, the liquid being discharged from the pipe in a direction toward the central or hottest region 25 of cylinder-closing wall 18. The liquid at this region has maximum velocity and hence maximum cooling effect. After discharge from pipe 22 the liquid flows in more or less random fashion within hollow head 16, the liquid leaving the head through ports 35 and flowing into the space surrounding cylinder 6 where it is effective to cool the cylinder walls.

A third pipe 37 (Fig. 1) leads from annular space 11 about a lower cylinder 6 to annular space 13 surrounding a cylinder 7 in the upper tier of cylinders. Liquid admitted to space 13 through third pipe 37 circulates in a more or less random manner throughout the space and cools the walls of cylinder 7.

Cylinder head 17 of cylinder 7 is substantially similar to the previously described cylinder head 16. As shown in Figs. 1 and 3, cylinder-closing wall 19 of head 17 has ports 40 which permit the liquid to flow from space 13 to the hollow interior of head 17. The liquid initially has a more or less random flow pattern in head 17.

A fourth pipe 42 in the cooling system is provided in head 17, pipe 42 being a substantial duplicate of the previously described pipe 22. Pipe 42 has a terminal end 43 leading from the central or hottest region 45 of cylinder-closing wall 19. The pipe extends through lateral wall 46 of cylinder head 17 to a connection with a header pipe 47 which forms part of a manifold system leading to a radiator device 48 (Fig. 3).

The location and orientation of terminal end 43 of pipe 42 is such that maximum flow velocity in the liquid is developed at the central or hottest region 45 of wall 19, thereby providing maximum cooling at this region.

Curved pipe 22 of head 16 is provided with one or more lateral apertures 50 (Fig. 1) adjacent the inside of head wall 23, the wall through which the pipe passes. An aperture 50 functions when it is desired to drain substantially all the cooling liquid from the system. When a valve (not shown) in first pipe 21 is opened to permit drainage, liquid in the cooling system enters pipe 22 mainly through terminal end 24 and thence drains through pipe 22, pipe 21 and out the valve. When the liquid level in the system falls below a horizontal line passing through terminal end 24, the remainder of the liquid flows through aperture or apertures 50, thereby insuring discharge of substantially all liquid in the system.

One or more similar lateral openings 52 (Fig. 1) are provided in pipe 42 of head 17. An opening 52 is located adjacent the inside of head wall 46, the wall through which pipe 42 passes. The purpose of an opening 52 is to provide a vent for the space within head 17 lying above a horizontal line extending through terminal end 43 of the pipe. Such venting prevents the formation of air or steam pockets in the cooling system since gas otherwise tending to accumulate above said horizontal line is vented to pipe 42 through an opening 52.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. In a diesel engine having generally hollow cylinder heads associated with cylinders surrounded by spaced jackets; a cooling system comprising a pump, a first pipe leading from said pump to a point adjacent a cylinder head, a second pipe leading from said first pipe through a wall of said cylinder head to a discharge end within said head adjacent the cylinder-closing wall of said head, the discharge from said second pipe being directed at the central region of said cylinder-closing wall whereby maximum cooling is provided at said central region, said head having ports leading to the space between the associated cylinder and jacket, a third pipe leading from said space to the space between an adjacent cylinder and the jacket thereof, the head of said adjacent cylinder having ports leading from said last named space to the hollow interior thereof, and a fourth pipe leading from the central region of the cylinder-closing wall of said last named head to the exterior of said head whereby maximum cooling is provided at said central region.

2. The combination of claim 1 wherein said diesel engine is of the horizontal V-type with the cylinders arranged in upper and lower tiers, said first pipe leading to the lower side of the head of a lower tier cylinder and said fourth pipe leading from the upper side of the head of an upper tier cylinder.

3. The combination of claim 2 wherein said fourth pipe has a lateral aperture adjacent the inside of the head wall through which it passes to prevent the formation of a vapor pocket within said head.

4. The combination of claim 2 wherein said second pipe has a lateral aperture adjacent the inside of the head wall through which it passes to permit substantially all the liquid to drain from said head.

5. In a diesel engine, a cooling system including a hollow cylinder head and a pipe extending through a wall of said head and terminating adjacent the cylinder-closing wall of said head, the terminal end of said pipe being directed at the central region of said cylinder-closing wall whereby maximum cooling is provided at said central region, said pipe having a lateral aperture therein, said aperture being adjacent the wall through which said pipe passes and within the interior of said head, said aperture providing a restricted path for fluids between the interiors of said pipe and said head.

References Cited in the file of this patent
UNITED STATES PATENTS

| | | |
|---|---|---|
| 1,915,104 | Ruehl | June 20, 1933 |
| 2,635,592 | Hollis | Apr. 21, 1953 |